Figure 1:
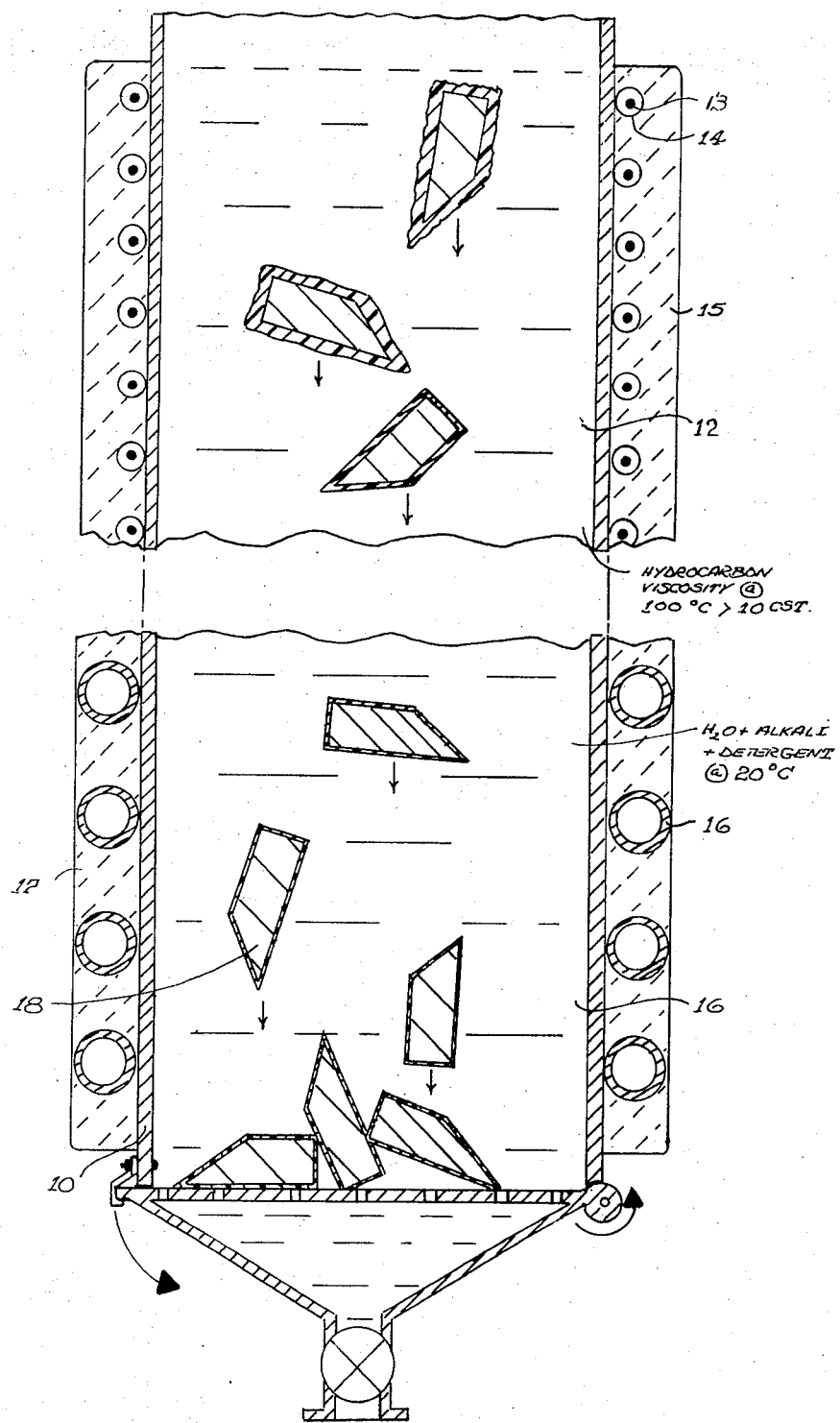

United States Patent [19]
Scheiber

[11] 3,864,149
[45] Feb. 4, 1975

[54] METHOD OF COATING WORKPIECES WITH THERMOPLASTIC SYNTHETIC RESINS

[75] Inventor: Werner Scheiber, Frankfurt am Main, Germany

[73] Assignee: Metallgesellschaft Aktiengesellschaft, Frankfurt am Main, Germany

[22] Filed: June 29, 1973

[21] Appl. No.: 375,009

[52] U.S. Cl................ 117/64, 117/21, 117/63, 117/102 R, 117/113, 117/132 C
[51] Int. Cl...... B44d 1/094, B44d 1/40, B32b/15/08
[58] Field of Search............. 117/132 C, 117/113, 117/102 R, 8, 10, 21, 64, 63, 62

[56] References Cited
UNITED STATES PATENTS

| | | | |
|---|---|---|---|
| 2,138,578 | 11/1938 | Hirshberger | 117/63 |
| 2,515,489 | 7/1950 | Borushko | 117/113 |
| 2,651,811 | 9/1953 | Coney | 117/138.8 |
| 2,684,553 | 8/1972 | Van Dyke | 117/63 |
| 2,771,378 | 11/1956 | Motter | 117/63 |
| 2,783,165 | 2/1957 | Borushko | 117/113 |
| 3,282,725 | 11/1966 | Van Zalinge | 117/113 |

Primary Examiner—William R. Trenor
Attorney, Agent, or Firm—Karl F. Ross; Herbert Dubno

[57] ABSTRACT

A process for coating a workpiece with a synthetic resin comprising the steps of adhering particles of a thermally fusible synthetic resin to the workpiece to form a layer thereon and thereafter smoothing the layer and fusing the particles into a continuum by treating the workpiece with a high-molecular-weight sulfuric acid-treated and/or bleaching-earth-treated liquid hydrocarbon nonreactive with the synthetic resin and at a temperature above the melting point of the synthetic resin; the liquid hydrocarbon has a viscosity at 100°C greater than 10 cSt.

9 Claims, 1 Drawing Figure

METHOD OF COATING WORKPIECES WITH THERMOPLASTIC SYNTHETIC RESINS

1. CROSS-REFERENCE TO RELATED APPLICATION

This application is related to my copending application Ser. No. 191,940 filed Oct. 22, 1971 and entitled "METHOD OF INTERNALLY COATING DUCTS WITH SYNTHETIC RESIN".

2. FIELD OF THE INVENTION

My present invention relates to a method of or a process for the coating of workpieces with synthetic resins and, more particularly, to the formation of continuous films or layers of thermoplastic synthetic resins upon metal workpieces.

3. BACKGROUND OF THE INVENTION

The aforementioned copending application describes a technique for applying synthetic-resin coatings to a metal workpiece which involves the step of adhering particles of a thermoplastic synthetic resin to a surface of the metal workpiece and thereafter causing the particles to coalesce and form a smooth continuum or layer upon the workpiece surface by treating the particle-covered surface with a fluid. That system, while especially effective for the coating of large bodies having internal bores or cavities, cannot be used with equal effectiveness in the coating of smaller workpieces at their external surfaces.

There has been described a system for coating such workpieces by causing them to fall freely through a column of paraffin oil heated to a temperature above the softening and, generally, above the melting temperature of the synthetic-resin particle layer which has been caused to adhere to the surface of the workpiece by any fritting, sintering or like technique. A typical particle adhesion method involves the introduction of the heated workpiece into a fluidized bed of the particles which thereupon adhere to the workpiece surface. Of course, other particle-applying techniques may be used, e.g., the spraying of particles onto the heated surface or the bulk deposition of particles thereon followed by removal of excess particles in an airstream.

The passage of the particle-coated workpieces through the column of heated paraffin oil, which is nonreactive with the synthetic resin, brings about coalescence of the particles and a smoothing of the layer.

In practice, paraffin oil with a flame point above 240°C is employed and is heated to a temperature of 230°C or a lesser temperature, depending upon the melting point of the synthetic resin. In the lower portion of the column, the paraffin oil may be unheated so that cooling takes place.

While this system has been found to be effective for applying coatings to small metal workpieces such as findings and clock- and watch parts, the coating has generally been defective in the sense that it is often not of uniform thickness, may be streaked or pitted and generally is discolored. This has been found to be especially the case with certain thermoplastic synthetic resins, namely, polyesters, polyvinylchloride, vinylchloride-vinylacetate mixed polymers and copolymers and polyamides. When such resin coatings are treated with neutral hydrocarbons such as paraffin oils, nonuniform contraction occurs to streak, stress or split the coating, induce blistering or the forming of pits or cavities.

4. OBJECTS OF THE INVENTION

It is the principal object of the present invention to provide a method of and a process for the coating of workpieces, especially metal workpieces, with thermoplastic synthetic resins whereby the aforementioned disadvantages can be obviated.

It is another object of the invention to provide a process for applying smooth uniform coatings of the above-identified synthetic resins to metal workpieces without streaking, splitting, pitting and the other surface deformities hitherto characterizing such coating efforts.

5. SUMMARY OF THE INVENTION

I have now found, most surprisingly, that the use of high-molecular-weight, preferably vacuum-distilled, hydrocarbon fractions which are treated before use for the present puruposes with sulfuric acid and/or bleaching earth (fullers earth or any of the bleaching earth compositions conventionally used in the treatment of oils) and, if required to achieve the viscosity described below, subjected to a hydriding or hydrogenation treatment, will avoid the aforedescribed disadvantages when the kinetic (dynamic) viscosity of these hydrocarbons is greater than 10 cSt at 100°C. In this case, none of the aforedescribed surface deformities are detected in the end product.

It has been found to be especially advantageous to treat the workpieces forllowing their passage through the heated hydrocarbon with water at a temperature close to ambient, e.g., by passing the workpieces through a lower portion of the column constituted by water. The water portion of the column is cooled and advantageously includes an alkali so as to have a weakly alkaline pH. Most advantageously a small quantity of detergent is also present in this water. The product is thereupon obtained free from adherent hydrocarbon.

The invention thus comprises the steps of applying a layer of a thermally fusible synthetic-resin in particle form, preferably one of the above-named resins, to a metal workpiece (preferably by introducing the workpiece into a fluidized bed of the synthetic-resin particles after it has been heated to the fusion temperature of the particle) and thereafter smoothing this particle layer by causing the workpiece with the particle layer adherent thereto to fall freely through a high-molecular-weight sulfuric-acid-treated and/or bleaching earth-treated naphthenic or paraffinic hydrocarbon vacuum distilled in the production of lubricating oils and having a viscosity at 100°C greater than 10 cSt and preferably between 15 and 50 cSt, the hydrocarbon column being heated to a temperature below its flashpoint and at least equal to the fusion (melting) temperature of the synthetic resin. Advantageously, the workpieces fall freely through this column over a period of 10 to 40 seconds, i.e., the height of the column is selected in accordance with its kinematic viscosity to bring about a contact time of 10 to 40 seconds and preferably 15 to 35 seconds. The hydrocarbon column is formed above a weakly alkaline water column (preferably of a pH between 7.1 and 9) which may be rendered alkaline by the addition of sodium hydroxide to the cooling water. The water may also contain betwen one part per million and 0.1 percent of a water-soluble detergent capable of dispersing hydrocarbons; suitable detergents include the alkyl-aryl sulfonates, alkylphenylether-polyethylene glycol nonionic surfactants and, in fact, any conventional detergent used in the washing of fabrics composed of the same synthetic resin. Prior to sulfuric acid or bleaching-earth treatment, the hydrocarbon should have a neutralization coefficient of about 0.01 to 0.5 mg KOH/g.

6. DESCRIPTION OF THE DRAWING

The above and other objects, features and advantages of the present invention will become more readily apparent from the following description, reference being made to the sole FIGURE which is a diagrammatic vertical section through a system for carrying out the process of the present invention.

7. SPECIFIC DESCRIPTION

In the drawing, I show a vertical vessel adapted to receive a liquid column consisting of a lower portion 11 of water containing an alkali and a detergent and an upper portion 12 constituted of the hydrocarbon with viscosity at 100°C greater than 10 cSt.

The hydrocarbon column is heated by a resistance wire 13 embedded in an electrically insulated sheath 14 and is surrounded by a layer 15 of thermally insulating material, the system 13 – 15 constituting a heating jacket for maintaining the temperature of the hydrocarbon above the fusion temperature of the synthetic resin. The lower portion 11 of the column is surrounded by a cooling jacket consisting of coolant tubes 16 enclosed by a thermally insulating layer 17. The workpieces 18, coated with particles of the synthetic resin, are caused to fall first through the hydrocarbon column and then through the water column which is maintained at a temperature of, say, 20°C.

8. SPECIFIC EXAMPLES

EXAMPLE I

Metal parts of buckles and clasps for a watch band having an average exposed surface area of 1 cm$^2$ are coated with polyamide (nylon) 11 powder having a particle size of 10 to 50 microns by heating the metal parts to a temperature above the polyamide and introducing them into a fluidized bed of the powder.

The particle coating is smoothed by dropping the parts through a liquid-hydrocarbon column having a temperature of 250°C so that the parts traverse the liquid column in 25 seconds. The liquid hydrocarbon is a paraffin-based vacuum distillate obtained in the production of lubricating oil and treated with concentrated sulfuric acid and bleaching earth. The hydrocarbon has, at 100°C, a kinematic viscosity of 19.5 cSt = 2.8°E as determined by the German Industrial Standards DIN 51 561 and 51 560 (see also ASTM Standards D444 and D445). The lubrication value was 0.08 mg KOH/g of paraffin oil prior to the treatment thereof as determined by German Industrial Standard DIN 51 558 or ASTM D664. The ash content is less than 0.005 percent by weight as determined by German Industrial Standard DIN 51 575.

After the particle-coated workpieces have traversed the oil column, they pass into an underlying water column having a pH of about 8 and maintained at a temperature of 20°C. The water column contains the detergent PRIL (.01 percent by weight). The workpieces collected at the bottom were examined and found to be uniformly coated with the polyamide and free from pores and streaks. The thickness of the coating is 180 microns. The nature of the detergent was not found to be critical.

EXAMPLE I$a$

For a comparison with the results of Example I, the procedures carried out using a sulfuric-acid-treated neutral oil with a kinematic viscosity at 100°C of 10 cSt = 1.84°E and a neutralization value of 0.06 mg KOH/g. The coatings of the workpieces recovered at the bottom of the column were found to be characterized by pore-like craters.

EXAMPLE I$b$

The process of Example I was carried out except that water with a pH of 7 and without a surface-active agent was employed in the lower part of the column. The workpiece coatings were found to entrain oil droplets which, after removal, left streaks on the surface.

EXAMPLE II

Example I is repeated except that the synthetic resin is soft polyvinylchloride powder with a melting range of 170° – 200°C, the liquid hydrocarbon is a paraffin-based white oil, and the fall time through the column of paraffin oil is 27 seconds.

The white oil is a paraffin-based cut obtained by vacuum distillation of petroleum in the lubricating oil production process and has a viscosity after agitation with sulfuric acid and bleaching earth followed by treatment with activated carbon, of 30 cSt = 4.1°E at 100°C. The white oil is heated to a temperature of 260°C and is maintained under a carbon dioxide atmosphere. Upon passage through the hydrocarbon column, the workpieces enter a water column containing detergent and alkali as described in Example I and held at a temperature of 20°C. The uniform continuous coating of polyvinylchloride was streak-free and pore-free in a thickness of 220 microns.

EXAMPLE II$a$

For comparison with the results obtained in Example II, the white oil was replaced with a neutral oil from the Fischer Tropsch synthesis with a viscosity at 100°C of 3 cSt = 1.22°E and a neutralization value below 0.01 mg KOH/g. The product had pore-like craters and a strongly orange discoloration.

EXAMPLE III

Iron workpieces as described in Example I are coated with a polyester powder of the diol-terephthalic acid type and are smoothed by passing through a superheated-steam cylinder oil in 18 seconds. The polyester had a melting range of 210° – 225°C and the oil a kinematic viscosity at 100°C of 38 cSt = 5°E. The oil is obtained from a naphthenic crude oil by vacuum distillation and is subjected to treatment with concentrated sulfuric acid and bleaching earth. The pretreated product has a neutralization value of 0.15 mg KOH/g. The pore-free and streak-free polyester coating had a thickness of about 200 microns and was completely smooth and uniform.

EXAMPLE III$a$

When the oil of Example III was replaced by paraffin oil heated to 270°C from Example I*a*, the workpieces were strongly discolored as in Example IIa.

I claim:

1. A process for coating a workpiece with a thermally-fusible synthetic resin comprising the steps of:
   a. heating a workpiece to at least the softening temperature of said resin;
   b. adhering particles of said synthetic resin to the workpiece by contacting the heated workpiece with said particles to form a rough fritted layer of said particles on said workpiece;
   c. thereafter coalescing and smoothing said layer and fusing said particles into a continuum by treating the workpiece with said layer adherent thereto with a high-molecular-weight liquid hydrocarbon in which said synthetic resin is insoluble at a temperature above the softening point of said synthetic resin, said liquid hydrocarbon having a viscosity at 100°C greater than 10 cSt; and
   d. thereafter cooling the synthetic-resin layer by treating it with water following step (c).

2. The process defined in claim 1 wherein said synthetic resin is selected from the group which consists of polyesters, polyvinylchlorides, vinylchloride-vinylacetate mixed polymers and copolymers, and polyamides.

3. The process defined in claim 1 wherein said water in step (*d*) is weakly alkaline.

4. The process defined in claim 3 wherein said water in step (*d*) further includes a detergent.

5. The process defined in claim 4 wherein said hydrocarbon is a naphthene-based or paraffin-based petroleum cut recovered by vacuum distillation, is treated with concentrated sulfuric acid and bleaching earth, has at 100°C a kinematic viscosity of 15 to 50 cSt, and has a neutralization coefficient prior to treatment of about 0.01 to 0.5 mg KOH/g.

6. The process defined in claim 5 wherein said hydrocarbon is provided in an upper portion and said water is provided in a lower portion of a column through which said workpiece is caused to fall freely, first contacting said hydrocarbon and then contacting said water.

7. The process defined in claim 6 wherein said upper portion of said column has a height sufficient to maintain the duration of fall of the workpiece through said hydrocarbon between 10 and 40 seconds.

8. The process defined in claim 7, further comprising the step of heating said upper portion of said column substantially to a temperature in the melting range of said synthetic resin and cooling said lower portion of said column to maintain the same at a temperature of substantially 20°C.

9. The process defined in claim 8 wherein said particles are adhered to said workpiece by heating said workpiece and introducing the heated workpiece into gas entraining said particles.

* * * * *